United States Patent [19]
Brannan

[11] 3,908,567
[45] Sept. 30, 1975

[54] APPARATUS AND METHOD FOR DEPOSITING PARTICULATE MATTER BENEATH THE SURFACE OF SOIL

[76] Inventor: Leonard M. Brannan, 376 N. 119 Plaza, Omaha, Nebr. 68154

[22] Filed: Dec. 7, 1973

[21] Appl. No.: 422,876

[52] U.S. Cl. .................................... 111/7; 222/193
[51] Int. Cl.² .......................................... A01C 23/02
[58] Field of Search ................ 111/7, 6, 1; 222/193

[56] References Cited
UNITED STATES PATENTS

| | | | |
|---|---|---|---|
| 3,139,848 | 7/1964 | Welty | 111/7 |
| 3,556,027 | 1/1971 | Ammann | 111/7 X |
| 3,618,538 | 11/1971 | Brannan | 111/7 |
| 3,653,550 | 4/1972 | Williams | 111/6 |
| 3,804,036 | 4/1974 | Seifert | 111/7 X |

*Primary Examiner*—Stephen C. Pellegrino
*Attorney, Agent, or Firm*—Dawson, Tilton, Fallon & Lungmus

[57] ABSTRACT

Apparatus is disclosed for applying dry fertilizer or seeds beneath the soil including a plurality of hollow applicator knives to which dry fertilizer or seeds are fed from a hopper which is pulled by a traction vehicle along with the knives. There is also included a source of pressurized ammonia. Liquid ammonia is fed from the source to a conduit behind each knife and directed onto a ribbon of the dry particulate matter deposited at the bottom of each channel formed by the knives. Pressurized ammonia gas is coupled from the top of the source of ammonia into a distribution chamber equipped with one outlet for each knife. A pressure-regulating valve is connected between the distribution chamber and a nozzle located in the conduit coupling the fertilizer or seeds to each applicator knife. Hence, the pressurized gas assists in delivering the particulate matter to the applicator knives and in forcing the pellets or seeds into the channel cut by the knives.

10 Claims, 2 Drawing Figures

APPARATUS AND METHOD FOR DEPOSITING PARTICULATE MATTER BENEATH THE SURFACE OF SOIL

BACKGROUND AND SUMMARY

The present invention relates to agricultural apparatus for depositing material beneath the surface of the ground. The material being deposited may include dry fertilizer pellets, pulverized fertilizer or seeds (herein collectively referred to as "particulate matter"). Persons skilled in the art will also appreciate that the invention may be used to deposit liquid fertilizer beneath the surface of the soil.

In general, systems are known for depositing dry fertilizer into the ground and contacting the fertilizer with liquid anhydrous ammonia in a common band or channel at a predetermined depth beneath the surface of the soil being treated.

Typically, in such systems, a knife or a plurality of knives are pulled by a tractor, and the tractor also pulls a hopper carrying the fertilizer and a tank of pressurized ammonia. In general, the details of construction of the hopper and its support, the support for the knives, and the ammonia tank and its support do not form a part of the present invention in that these things can be accomplished in many different ways. However, a preferred applicator knife is disclosed in my U.S. Pat. Nos. 3,605,657, issued Sept. 20, 1971, and 3,618,538, issued Nov. 9, 1971. These patents are incorporated herein by reference, and additional details may be obtained from them, if desired.

Briefly, the present invention in its broader aspects is more concerned with the discovery that significant advantages can be achieved in depositing particulate matter beneath the soil through the use of pressurized gas. I have found it most convenient to use the pressurized gas which necessarily accumulates at the top of the pressurized ammonia container since it is readily available, easily controlled, and otherwise is a source of wasted energy, if not employed. However, it will be appreciated that pressurized propane or other source of gas under pressure may equally well be employed in place of the pressurized ammonia. In systems of this type, some of the liquid vaporizes; and it is always present at the top of the ammonia tank in the form of a highly pressurized gas. Hence, as mentioned, the preferred embodiment makes sufficient use of this gas, which otherwise would be released into the atmosphere when the tank is opened for refilling with liquid ammonia.

In the preferred embodiment, the operator station on the tractor is equipped with two levers. One lever controls the lowering of the applicator knives into the ground; and the second lever, wen actuated, controls the flow of pressurized hydraulic fluid to energize an agitator in the hopper storing the fertilizer pellets. At the same time, a hydraulic cylinder us actuated to move a slide at the bottom of the hopper and uncover the fertilizer tubes a predetermined amount, thereby controlling or "gauging" the amount of fertilizer fed to each of the knives.

This second lever on the tractor also actuates two pressure regulator valves, one coupling liquid anhydrous ammonia to the knives, and the other coupling gaseous ammonia from the top of the tank to a distribution chamber.

The distribution chamber has five outlets, one associated with each of the applicator knives in the preferred embodiment. A pressure regulator is located in each line feeding the knives with fertilizer. The pressurized gas is directed into the line in such a manner that it forces any particulate matter in the line through the remainder of the line and into the knife. Thus, the gas is used to keep the fertilizer conduits clear, to assist in delivering the fertilizer to the knives, and to create a positive pressure differential between the location at which the fertilizer is released in the bottom of the channel cut by the knives and the rearward location at which the liquid anhydrous ammonia is released. This latter action traps the liquid ammonia in the channel formed in the earth which is then covered by means of moldboards mounted on the side of the knives in accordance with the teachings of the above-identified patents. The amount of fertilizer delivered from the hopper may be controlled by an adjustment in the hydraulic cylinder which opens and closes the gauge slide at the bottom of the hopper.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a diagrammatic view of a material applicator system incorporating the present invention; and FIG. 2 is a plan view, partially broken away, of the slide gauge at the bottom of the hopper storing the particulate matter.

DETAILED DESCRIPTION

Figure 1:
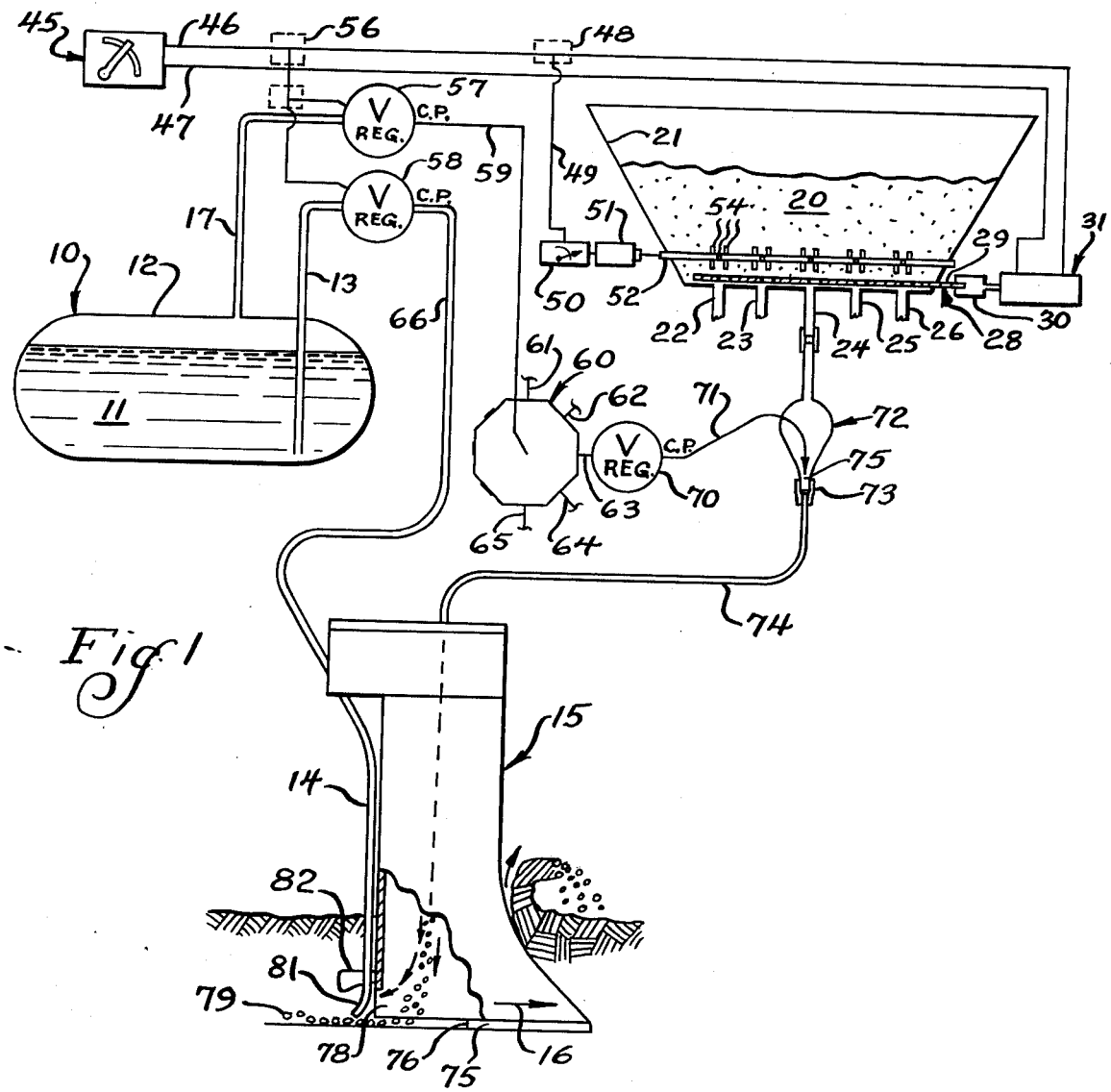

Referring first to FIG. 1, reference numeral 10 generally designates a tank storage anhydrous liquid ammonia 11 under pressure. At the top of the tank 10 there is ammonia in the gaseous state as indicated by reference numeral 12 which is also under pressure. Typically, the pressure within the tank 10 may be as high as 200 psi at 100° F., i.e., when the tank has been exposed to the sun for any period of time. At first conduit 13 extends into the tank 10 and terminates near the bottom of the tank for delivering the liquid anhydrous ammonia 11 to a pipe 14 located on the rear of an applicator knife generally designated 15. The knife 15 is traveling in the direction of the arrow 16 in FIG. 1, and it is contemplated that in the preferred embodiment there would be five such knives pulled on a common frame by a tractor.

A second conduit designated 17 is connected to the top of the tank 10, and it is used to communicate the gaseous ammonia 12 from the pressurized bank, as will be more fully disclosed below.

Dry fertilizer, designated 20, is stored in a hopper 21. As disclosed in the above-referenced U.S. Pat. No. 3,605,657, the hopper for the dry fertilizer, the ammonia tank, and the knives may be supported by a common wheel-equipped frame. Alternatively, the tank 10 may be separately supported, if it is quite large.

At the bottom of the tank 21 there are five separate conduits designated 22–26 respectively, which receive the fertilizer under force of gravity. Because of the highly corrosive nature of the fertilizer, the hopper, conduits 22–26 and other metal parts are preferably made out of stainless steel. Alternatively, conventional seed metering devices may be used to deliver seeds for planting to the discharge conduits 22–26. The seeds would then be delivered under gravity to the bulb 72 and there forced under gaseous pressure through conduit to a conventional soil opening knife and deposited beneath the surface of the soil. The number of discharge conduits may vary from one to any number, depending upon the application.

At the bottom of the hopper 21 just above the conduits 22–26 is a horizontal slide member 28 which extends out of one side of the hopper as at 29, where it is connected to the rod end 30 of a hydraulic cylinder and piston rod unit 31. The hydraulic cylinder 31 is a double-acting cylinder.

Figure 2:
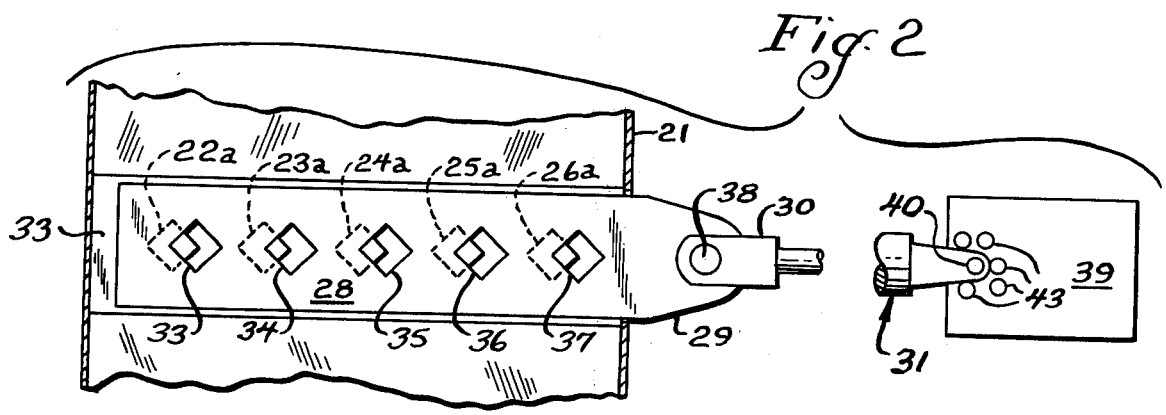

As seen best in FIG. 2, the bottom of the hopper 21, designated by reference numeral 33 is provided with five generally square apertures, designated respectively 22a–26a, and associated respectively with the conduits 22–26. On the slide 28 there are five corresponding apertures designated 33–37 respectively and each having a shape generally conforming to the shape of the apertures 22a–26a. When the slide 28 is fully inserted in the hopper, the apertures 34–37 fully register with the apertures 22a–26a; and in this position, the maximum amount of fertilizer is delivered from the hopper 21. There is greater spacing between the holes 22a–26a than is shown in FIG. 2 to permit the slide 28 to be removed to an "off" position (that is, displaced to the right in FIG. 2), without overlapping the next adjacent apertures. Thus, the slide 28 comprises a gauging means for delivering a predetermined amount of fertilizer, depending on its "open" position relative to the apertures in the bottom of the hopper.

The rod end 30 of the hydraulic cylinder and piston rod unit 31 is pivotally connected or pinned as at 38 to the exposed end 29 of the slide 28. The cylinder end of the unit 31 is similarly pivotally connected to an apertured plate 39 by means of a pin 40. The plate 39 is rigidly attached to the frame which carries the hopper 21; and it is provided with a plurality of round holes 43, the centers of which are spaced as predetermined increments from the axis of the pin 38. For example, the centers of the holes 43 may be spaced at one-quarter inch spacing from the axis of the pin 38. The throw of the hydraulic unit 31 is fixed; hence, adjustment of the amount of fertilizer pellets delivered from the hopper 21 into the conduits 22–26 is determined by the location of the cylinder end of the unit 31 into one of the holes 43. Once this setting is made, there normally is no need to change or vary the amount of fertilizer being delivered to the conduits 22–26 for a particular application.

Returning again to FIG. 1, reference numeral 45 generally designates a hand-operated lever which preferably is located on the tractor adjacent the operator's position. The lever 45 controls a hydraulic valve which enables pressurized hydraulic fluid to flow in one line 46 from a power takeoff on the tractor or from a hydraulic pump energized by the prime mover of the tractor. When the lever 45 is in a second position, the pressurized hydraulic flud flows in a line 47. The lines 46 and 47 are connected to the hydraulic cylinder and piston rod unit 31 to move the rod in two different directions for opening and closing the apertures 22a–26a by means of the slide gauge 28, as disclosed.

In addition, a tee 48 in the line 46 couples the pressurized hydraulic fluid by means of a line 49 to a conventional speed regulator 50 which, in turn, feeds a hydraulic motor 51. The output shaft of the hydraulic motor 51 is coupled to an agitator shaft 52 journalled in opposing sides of the hopper 21 and extending above the apertures 22a–26a. At each of the five locations represented by these apertures, there is located on the shaft 52 a plurality of stubs or pins designated 54 for the aperture 22a. Thus, when the lever 45 is placed in the operative position, the shape 52 is driven, and the pins 54 agitate and break up the particulate matter in the hopper to facilitate unobstructed flow of the fertilizer through the conduits 22–26.

A second tee in the line 46, designated 56, couples the pressurized hydraulic fluid to a first hydraulically operated pressure-regulating valve 57 connected in the gas conduit 17, and to a second, similar pressure-regulating valve 58 connected in the liquid ammonia line 13. The outlet of the valve 57 is connected to a line 59 which feeds a distribution chamber generally designated by reference numeral 60 and having five separate output lines or conduits 61–65 associated respectively with the conduits 22–26 of the hopper 21. The outlet of the second pressure-regulating valve 58 is connected by means of a flexible hose 66 to the conduit 14 located immediately behind the plow knife 15.

In each of the outlets 61–65 of the distribution chamber 60 there is a pressure-regulating valve. One such valve is shown in the outlet conduit 63, and it is designated by reference numeral 70.

The output of the pressure regulator 70 is coupled by means of a conduit 71 into a bulb generally designated 72 which receiver fertilizer from the conduit 24 on the bottom of the hopper 21. The bulb 72 has an output end 73 which is connected to the applicator knife 15 by means of a flexible conduit 74. The conduit 71 terminates as at 75 adjacent the outlet 73 of the bulb 72, and it is oriented in such a manner as to direct the escaping ammonia gas into the flexible conduit 74, thereby assisting the delivery of fertilizer from the bulb 72 into the knife 15. This also creates suction on the conduit 24 to assist gravity in the delivery of fertilizer from the hopper to the bulb.

As disclosed in the above-referenced patents, the knife 15 has a generally rectangular horizontal cross section, and it is hollow so that pellets of fertilizer delivered to it are blown by ammonia vapor pressure to the bottom. The forward portion of the bottom of the knife 15 is provided with a sole 75 which terminates as at 76 to provide an opening 78 through which the fertilizer flows and is deposited in a band as at 79 in the channel being formed by the knife. The conduit 14 through the liquid anhydrous ammonia is forced is bent slightly rearwardly as at 81 adjacent the opening 78 for directing the liquid ammonia into the band of deposited fertilizer. A pair of side moldboards, one of which is shown at 82 is then used to gather soil from the side of the channel being formed by the knife 15 and force it over the pellets which have been sprayed with the liquid ammonia.

One aspect of the invention which is considered to be important is the provision of individual pressure regulators in each line between the distribution chamber 60 and the fertilizer lines. In this manner, if any individual lines or applicators become partially or temporarily obstructed, the resulting increase in pressure is not reflected back to influence the pressure in the other lines; and the pressure in the partially obstructed line will clear that line for subsequent operation.

There is one problem which merits particular attention in designing equipment to practice the invention; and it is that whereas the ammonia gas from the outlet 75 of the tube 71 (which may be termed a Venturi) is primarily directed to assist in delivering the fertilizer into the flexible delivery conduit 74. Nevertheless, should the delivery conduit or applicator knife become blocked, a back pressure would develop; and some of the ammonia gas would back up through the conduit 24 into the lower portion of the hopper 21. The gas has a tendency to enter the hopper 21 and move laterally beneath the agitator shaft 52 into the bearings supporting the shaft. When ammonia vapor contacts air, it forms a glue-like substance which could freeze the bearings if the condition occurs while the machine is idle for a few hours. I have solved this by mounting a separate plate between the bearings and the side of the hopper. This plate acts as a guard plate, and it is provided with a vent through which any ammonia gas may be vented to the atmosphere without contacting the bearing.

OPERATION

In operation, the person driving the tractor first lowers the plow knives 15 into the ground by means of a hydraulic lever, not shown. Next, he actuates the lever 45 which enables pressurized hydraulic fluid to enter the line 46. This hydraulic fluid simultaneously opens the pressure regulating valves 57 and 58 which, in turn, admit the pressurized gas from the tank 10 into the distribution chamber 60 and permit the pressurized liquid ammonia 11 to flow through the conduit 13, conduit 66 and tube 14 behind the applicator knife 15.

At the same time, the agitator motor 51 is started, and the hydraulic cylinder and piston rod unit 31 is actuated to move the slide gauge 28 to the left, thereby opening the apertures 22a–26a to a predetermined setting. The fertilizer thence flows through the conduits 22–26 into the bulbs, one of which is shown at 72 as described above. Pressurized ammonia gas flows from the distribution chamber 60 through regulator valve 70 into the line 71; and it is discharged adjacent the outlet 75 and directed into it--thereby forcing the fertilizer within the bulb 72 into the conduit 74, and thence into the hollow center of the applicator knife 15.

As I have mentioned, my invention makes use of the gaseous ammonia in the tank 10 to clean out the conduits leading from the bulbs (which preferably are spaced relatively closely to the outlet conduits of the hopper) into the knives 15. Secondly, a positive static pressure is created by the ammonia gas being released, not only to force the particulate matter to be deposited, but to create a back pressure adjacent the bent portion 81 of the tube 14, thereby trapping the liquid ammonia in the channel until it can be covered by dirt gathered by the moldboards. All of this is accomplished conveniently by an operator under control of the lever 45. Further, by using the arrangement of apertures 43 on the plate 39 to which one end of the cylinder unit 31 is connected, a constant-throw hydraulic cylinder and piston rod unit may be used to control the slide 28, yet achieve variable settings for flow of the particulate matter.

When the hydraulic lever 45 is reversed, the fluid flow reverses in the unit 31 to close the slide 28. Return lines for the hydraulic fluid are also as required. At the same time, the valves 57 and 58 are closed, and the motor 51 is de-energized.

Having thus described in detail a preferred embodiment of the present invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

I claim:

1. Apparatus for depositing material beneath the surface of soil comprising: a source of material pulled by a tractor; a plurality of discharge conduits each connected at an input end to said source to receive said material and including an outlet end for delivering said material; a plurality of applicator knives pulled by said tractor and each knive including a channel coupled to the outlet end of an associated one of said discharge conduits for receiving material from said source, each knife further defining a discharge opening extending partially up the rear wall of the knife for depositing said material at the bottom of a trough cut by the knife; a source of pressurized ammonia pulled by said tractor; a tube behind each applicator knife and including a discharge orifice for depositing liquid ammonia from said source in said band, said discharge orifice of each knife being located beneath the uppermost extension of an associated discharge opening of a knife whereby said gaseous ammonia released from a knife will tend to maintain the liquid ammonia in a band unitl it is covered; fluid conduit means including pressure-regulating means for introducing gas from said source under pressure into each discharge conduit at a location adjacent said input end of each discharge conduit to thereby assist the delivery of said material to said knives and to maintain gas flow through substantially the entire length of said discharge conduits and said channels of said knives; and means for controlling the delivery of said gas to said discharge conduits; whereby said conduits and said knives are continuously subject to the flow of pressurized gas and said gas and material is discharged through said discharge openings of said knives.

2. The apparatus of claim 1 wherein said material is particulate matter and said system further including a distribution chamber receiving said pressurized gas and including a plurality of outlet conduits, one connected to each of the discharge conduits; and pressure-regulator means interposed between each outlet conduit of said distribution chamber and an associated discharge conduit, whereby if one discharge conduit delivering material to an applicator knife is partially or temporarily blocked, the resulting pressure fluctuations are not reflected to the other conduits delivering said material.

3. The apparatus of claim 2 further comprising bulb means in each of said discharge conduits of said source and adjacent the input end thereof and defining an outlet orifice; and a tube leading from an associated pressure-regulator means coupling said pressurized gas and directing said gas into the outlet orifice in the direction of flow of said material toward an associated applicator knife.

4. The apparatus of claim 2 wherein said gas is ammonia and further comprising a hydraulically actuated regulator valve in said fluid conduit means from said source of pressurized ammonia, and wherein said source of pressurized gas comprises the gaseous ammonia at the top of said source of ammonia, said system further comprising hydraulic power means including a lever located on the traction vehicle for selectively actuating said regulator valve.

5. The system of claim 4 wherein said material is dry fertilizer and said source of material comprises a hopper feeding said discharge conduits; a slide bar slidably received in the base of said hopper and including a plurality of apertures, one associated with each of the discharge conduits of said hopper, said discharge conduits being in fluid communication with the bottom of said hopper, said slide being movable between a first position closing said discharge conduits and a second position opening said conduits a predetermined amount; and hydraulic cylinder means operable by the operator for moving said slide between said first and second positions.

6. The apparatus of claim 5 wherein said hydraulic cylinder means includes a rod end and a cylinder end; means pivotally connecting one of said rod end or cylinder end of said hydraulic cylinder means to said slide; said system further comprising plate means defining a plurality of apertures spaced at different distances between the frame of said apparatus and the pivotal connection of said hydraulic cylinder means to said slide, whereby the other end of said hydraulic cylinder unit may be connected to a location on said plate to determine the opening in said outlet conduits of said hopper.

7. The system of claim 2 further comprising agitator means in said source of material adjacent the outlet conduits thereof; and hydraulically actuated fluid motor means for driving said agitator means in response to actuation by the operator.

8. In a system for applying dry particulate material beneath the surface of soil including a traction vehicle, a plurality of ground-cutting applicator knives pulled by said vehicle, a source of said material pulled by said vehicle and including a discharge conduit for each applicator knife for delivering material thereto, said material flowing to the bottom of said knife and being deposited in the bottom of a slit cut by said knife; a source of pressurized ammonia; and an ammonia conduit coupling liquid ammonia to each of said knives and depositing it onto the band of dry material, the improvement comprising: a source of fluid pressure including lever means on said traction vehicle actuatable by an operator of said vehicle while driving the same; gas conduit means including pressure regulating means in fluid communication with the top of said source of pressurized ammonia for coupling ammonia gas at the top of said source under pressure to each of the discharge conduits of said source of material, the pressure of said gas assisting in delivering said material to said applicator knives; a first fluid-operated pressure regulator valve actuatable by said source of fluid pressure when said operator actuates a lever means and interposed in said gas conduit means for selectively communicating said gas to said discharge conduits of said source of fertilizer; a second fluid-operated pressure regulator valve means located in said liquid outlet conduit of said source of pressurized ammonia and actuatable by said source of fluid pressure for selectively coupling said liquid ammonia to said applicator knives; gauging means associated with said source of material and movable between a first position for covering the outlet conduits thereof and a second position for delivering a predetermined amount of material to said outlet conduits; and fluid-operated cylinder means for selectively moving said gauging means between said first and second positions and actuatable by said source of fluid power.

9. The apparatus of claim 8 further comprising agitator means in said source of fertilizer including a plurality of agitator bars adjacent each of said outlet conduits thereof; and fluid operated motor means energized by said source of fluid power for driving said agitator means when actuated.

10. The apparatus of claim 9 further comprising means for adjusting the position of said gauging means in said second position, thereby to set the amount of fertilizer delivered to each of said outlet conduits when said fluid-operated cylinder unit is actuated.

* * * * *